(12) United States Patent
Bradley et al.

(10) Patent No.: US 9,551,841 B2
(45) Date of Patent: Jan. 24, 2017

(54) OPTICAL DATA CENTER CONNECTOR SYSTEMS, FIBER OPTIC PLUG ASSEMBLIES, AND FIBER OPTIC RECEPTACLE ASSEMBLIES

(71) Applicant: Corning Cable Systems LLC, Hickory, NC (US)

(72) Inventors: Mark Alan Bradley, Hickory, NC (US); Micah Colen Isenhour, Lincolnton, NC (US); Dennis Michael Knecht, Hickory, NC (US); James Phillip Luther, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 13/799,387

(22) Filed: Mar. 13, 2013

(65) Prior Publication Data
US 2014/0153875 A1 Jun. 5, 2014

Related U.S. Application Data

(60) Provisional application No. 61/731,581, filed on Nov. 30, 2012.

(51) Int. Cl.
*G02B 6/38* (2006.01)
(52) U.S. Cl.
CPC ........... *G02B 6/3807* (2013.01); *G02B 6/3847* (2013.01); *G02B 6/3853* (2013.01); *G02B 6/3885* (2013.01); *G02B 6/3887* (2013.01); *G02B 6/3893* (2013.01); *G02B 6/3821* (2013.01)

(58) Field of Classification Search
CPC .... G02B 6/3847; G02B 6/3853; G02B 6/3885
See application file for complete search history.

(56) References Cited

U.S. PATENT DOCUMENTS

| | | | |
|---|---|---|---|
| 6,012,852 A * | 1/2000 | Kadar-Kallen et al. | 385/74 |
| 6,530,696 B1 * | 3/2003 | Ueda et al. | 385/60 |
| 6,832,858 B2 * | 12/2004 | Roth et al. | 385/71 |
| 6,955,479 B2 | 10/2005 | Erdmann et al. | 385/78 |
| 6,960,025 B2 | 11/2005 | Gurreri | 385/58 |
| 7,118,286 B2 | 10/2006 | Gurreri et al. | 385/58 |
| 7,182,523 B2 | 2/2007 | Abendschein et al. | 385/56 |
| 7,207,724 B2 | 4/2007 | Gurreri | 385/58 |
| 7,325,976 B2 | 2/2008 | Gurreri et al. | 385/58 |
| 7,651,277 B2 | 1/2010 | Gurreri et al. | 385/58 |
| 9,304,265 B2 * | 4/2016 | Isenhour | G02B 6/3829 |
| 2009/0154884 A1 * | 6/2009 | Chen et al. | 385/79 |

(Continued)

*Primary Examiner* — Omar R Rojas (57) ABSTRACT

Optical data center connector systems including a fiber optic plug assembly and a fiber optic receptacle assembly. In one embodiment, a fiber optic plug assembly includes a plug body having an insertion surface and a plug body opening at the insertion surface, wherein the plug body defines a ferrule enclosure coupled in free space to the plug body opening, and a ferrule element disposed within the ferrule enclosure of the plug body. The ferrule element includes a mechanical coupling face, an optical interface surface, and a plurality of lens elements at the optical interface surface. The ferrule element is disposed within the ferrule enclosure such that the optical interface surface is recessed with respect to the insertion surface of the plug body.

38 Claims, 9 Drawing Sheets

(56) References Cited

U.S. PATENT DOCUMENTS

| | | |
|---|---|---|
| 2011/0058774 A1 | 3/2011 | Gurreri et al. |
| 2011/0229090 A1* | 9/2011 | Isenhour ............... G02B 6/3821 385/78 |
| 2011/0286698 A1 | 11/2011 | Greenberg et al. ............. 385/53 |
| 2014/0193120 A1* | 7/2014 | Hodge ................. G02B 6/3893 385/79 |

* cited by examiner

OPTICAL DATA CENTER CONNECTOR SYSTEMS, FIBER OPTIC PLUG ASSEMBLIES, AND FIBER OPTIC RECEPTACLE ASSEMBLIES

PRIORITY

This application claims the benefit of priority under 35 U.S.C. §119 of U.S. Provisional Application Ser. No. 61/731,581 filed on Nov. 30, 2012 the content of which is relied upon and incorporated herein by reference in its entirety.

FIELD

The technology of the present disclosure relates to fiber optic connectors and, more particularly to optical data center connector systems including a fiber optic plug assembly and a fiber optic receptacle assembly.

BACKGROUND

Benefits of optical fiber include extremely wide bandwidth and low noise operation. Connectors are often used in cable management systems to provide service connections to rack-mounted equipment and to provide inter-rack connections. Typical connectors for mating fiber optics include two connectors that are joined by an adapter. As one example of a connector, an MPO-style connector is a multi-fiber connector suitable for high-density backplane and printed circuit board (PCB) applications for data and telecom systems. MPO-style connectors generally utilize adapters, which align the MPO-style connectors with other multi-fiber connectors for forming a connection therebetween.

SUMMARY

In one embodiment, a fiber optic plug assembly includes a plug body having an insertion surface and a plug body opening at the insertion surface, wherein the plug body defines a ferrule enclosure coupled in free space to the plug body opening, and a ferrule element disposed within the ferrule enclosure of the plug body. The ferrule element includes a mechanical coupling face configured to contact a mated mechanical coupling face of a mated receptacle ferrule, an optical interface surface, and a plurality of lens elements at the optical interface surface. The ferrule element is disposed within the ferrule enclosure such that the optical interface surface is recessed with respect to the insertion surface of the plug body.

In another embodiment, an optical cable assembly includes a fiber optic plug assembly and a fiber optic cable. The fiber optic plug assembly includes a plug body having an insertion surface and a plug body opening at the insertion surface, wherein the plug body defines a ferrule enclosure coupled in free space to the plug body opening, and a ferrule element disposed within the ferrule enclosure of the plug body. The ferrule element includes a mechanical coupling face configured to contact a mated mechanical coupling face of a mated receptacle ferrule, an optical interface surface, and a plurality of lens elements at the optical interface surface. The ferrule element is disposed within the ferrule enclosure such that the optical interface surface is recessed with respect to the insertion surface of the plug body. The fiber optic cable includes a plurality of optical fibers disposed in the ferrule element and optically coupled to the plurality of lens elements.

In yet another embodiment, a fiber optic receptacle assembly includes a receptacle housing having an insertion surface and a receptacle opening at the insertion surface, wherein the receptacle housing defines a ferrule enclosure coupled in free space to the receptacle opening, and a ferrule element disposed within the ferrule enclosure of the receptacle housing. The ferrule element includes a rear surface, a mechanical coupling face configured to contact a mated mechanical coupling face of a mated plug ferrule, an optical interface surface, and a plurality of lens elements at the optical interface surface. The ferrule element is disposed within the ferrule enclosure such that the optical interface surface is recessed with respect to the receptacle opening of the receptacle housing. The fiber optic receptacle assembly further includes a bias member positioned within the ferrule enclosure between the rear surface of the ferrule element and an interior wall of the receptacle housing, wherein the ferrule element translates away from the receptacle opening when the fiber optic receptacle assembly is coupled to a mated fiber optic plug assembly.

In yet another embodiment, an optical data center connector system includes a fiber optic plug assembly and a fiber optic receptacle assembly. The fiber optic plug assembly includes a plug body defining a plug enclosure, the plug body including a plug body opening, and a plug ferrule element positioned within the plug enclosure such that the plug ferrule element is recessed from an insertion surface of the plug body. The fiber optic receptacle assembly includes a receptacle housing defining a receptacle enclosure, the receptacle housing including a receptacle opening, and a receptacle ferrule element positioned within the receptacle enclosure such that the receptacle ferrule element is recessed from a front surface of the plug body. Each of the plug ferrule element and the receptacle ferrule element has an optical interface surface.

In yet another embodiment, an optical data center connector system includes a fiber optic plug assembly and a fiber optic receptacle assembly. The fiber optic plug assembly includes a plug body having an insertion surface and a plug body opening at the insertion surface wherein the plug body defines a plug ferrule enclosure coupled in free space to the plug body opening, and a plug ferrule element. The fiber optic receptacle assembly includes a receptacle housing having a front surface and a receptacle opening at the front surface wherein the receptacle housing defines a receptacle enclosure coupled in free space to the receptacle opening, and a receptacle ferrule element disposed within the receptacle enclosure of the receptacle housing. Each of the plug ferrule element and the receptacle ferrule element includes a mechanical coupling face configured to contact a mated mechanical coupling face of a mated receptacle ferrule, an optical interface surface, and a plurality of lens elements at the optical interface surface, wherein the optical interface surface is offset from the mechanical coupling face. The plug body is positioned within the receptacle enclosure defined by the receptacle housing when the fiber optic plug assembly is mated with the fiber optic receptacle assembly. The plug body and the receptacle housing are configured to align the plurality of lens elements of the plug ferrule element with the plurality of lens elements of the receptacle ferrule element. The mechanical coupling face of the plug ferrule element contacts the mechanical coupling face of the receptacle ferrule element when the fiber optic plug assembly is mated with the fiber optic receptacle assembly. A gap is present between the optical interface surface of the plug ferrule element and the optical interface surface of the receptacle ferrule element when the fiber optic plug assembly is mated with the fiber optic receptacle assembly.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein relate to optical fiber data center connectors and cable assemblies for facilitating information exchange over optical fibers; however, the plug and receptacle assemblies may be used in other applications besides data centers. Optical center data center connectors and cable assemblies provide information pathways within data center racks or cabinets, and to external connection points. More specifically, fiber optic plug assemblies and fiber optic receptacle assemblies of optical data center connector systems include a recessed ferrule element disposed within an outer housing or body. The ferrule element includes an optical interface defined lens elements protruding from an optical interface surface. Having the ferrule element recessed within a housing protects the lens elements from accidental mechanical damage because the optical interface surface does not protrude from the housing.

As described in more detail below, a fiber optic plug assembly according to one embodiment includes a plug body defining a plug enclosure. A plug ferrule element is disposed within the plug body such that an optical interface surface is recessed from an opening of the plug body. A fiber optic receptacle assembly comprises a receptacle housing defining a receptacle enclosure configured to receive the plug body of the fiber optic plug assembly. Disposed within the receptacle enclosure is a receptacle ferrule element having an optical interface surface that is recessed from an opening of the receptacle housing. When the fiber optic plug assembly is inserted into the receptacle enclosure of the fiber optic receptacle assembly, the outer surface of the plug body and the inter surface of the receptacle housing guide the fiber optic plug assembly into a position such that the receptacle ferrule element is inserted into the plug body and the two optical interface surfaces of the respective ferrules are optically aligned.

In some embodiments, alignment features, such as alignment pins and corresponding alignment bores, may be provided on the plug ferrule element and the receptacle ferrule element for fine alignment of the two ferrules during engagement. To prevent pin stubbing of the alignment pins (i.e., one or more pins striking an insertion surface rather than entering one or more corresponding alignment bores), the plug body may include a lead-in structure to pre-align alignment features of the two ferrules. For example, in one embodiment, the lead-in structure is configured as a flare at the opening of the plug body that narrows internally a ferrule enclosure defined by the plug body. The configuration of the ferrule enclosure enables telescoping the plug body over the receptacle ferrule element to achieve pre-alignment. Thus, pin stubbing of the alignment pins may be avoided.

Additionally, as described in more detail below, the plug ferrule element and/or the receptacle element may be configured to float (i.e., have limited movement or play) within the respective enclosure. Accordingly, the plug ferrule element and/or the receptacle ferrule element may be isolated by external forces applied to either the plug body or the receptacle housing.

When the fiber optic plug assembly is coupled to the fiber optic receptacle assembly, the optical interface surface of the plug ferrule element is offset from, and does not contact, the optical interface surface of the receptacle ferrule element. Accordingly, lens elements of the respective ferrule elements are separated by a gap and do not contact each other when the fiber optic plug assembly is coupled to the fiber optic receptacle assembly.

Figure 1A:
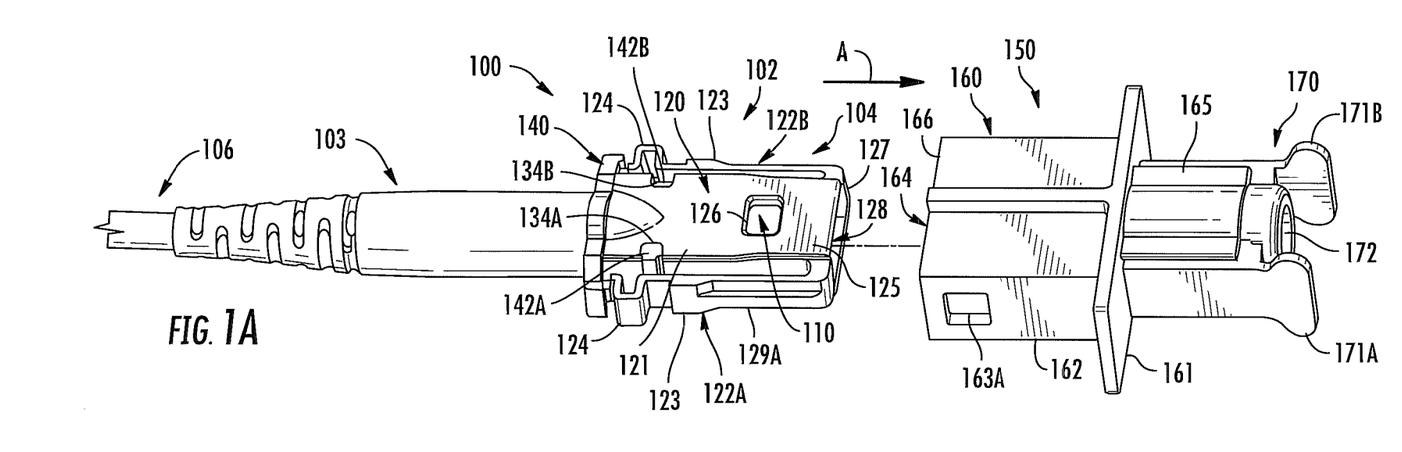
FIG. 1A is a perspective view of an exemplary optical data center connector system including an exemplary a fiber optic plug assembly of an optical cable assembly and an exemplary fiber optic receptacle assembly in an unmated relationship.
Figure 1B:
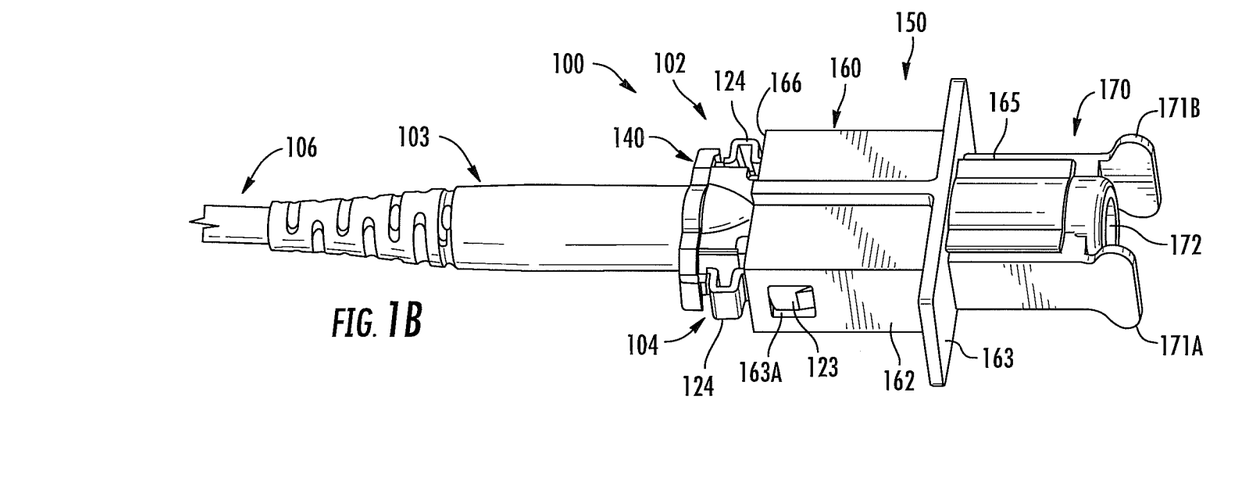
FIG. 1B is a perspective view of the exemplary optical data center connector system depicted in FIG. 1A wherein the fiber optic plug assembly and the fiber optic receptacle assembly are in a mated relationship.

In this regard, FIGS. 1A and 1B depict an exemplary data center connector system 100 in disconnected and connected states, respectively. The data center connector system 100 includes an optical cable assembly 102 and a fiber optic receptacle assembly 150. The fiber optic receptacle assembly 150 may be provided in a cabinet, rack or other device of a data center, for example. The external components of the optical cable assembly 102 and the fiber optic receptacle assembly 150 will first be described with reference to FIGS. 1A and 1B, followed by a description of a fiber optic plug assembly 104 of the fiber optic cable assembly (FIGS. 2A-3B), a description of the fiber optic receptacle assembly 150 (FIG. 4), and a description with respect to cross-sectional views of the fiber optic plug assembly 104 and the fiber optic receptacle assembly 150 in mated and unmated states (FIGS. 5A-5C).

Figure 2A:
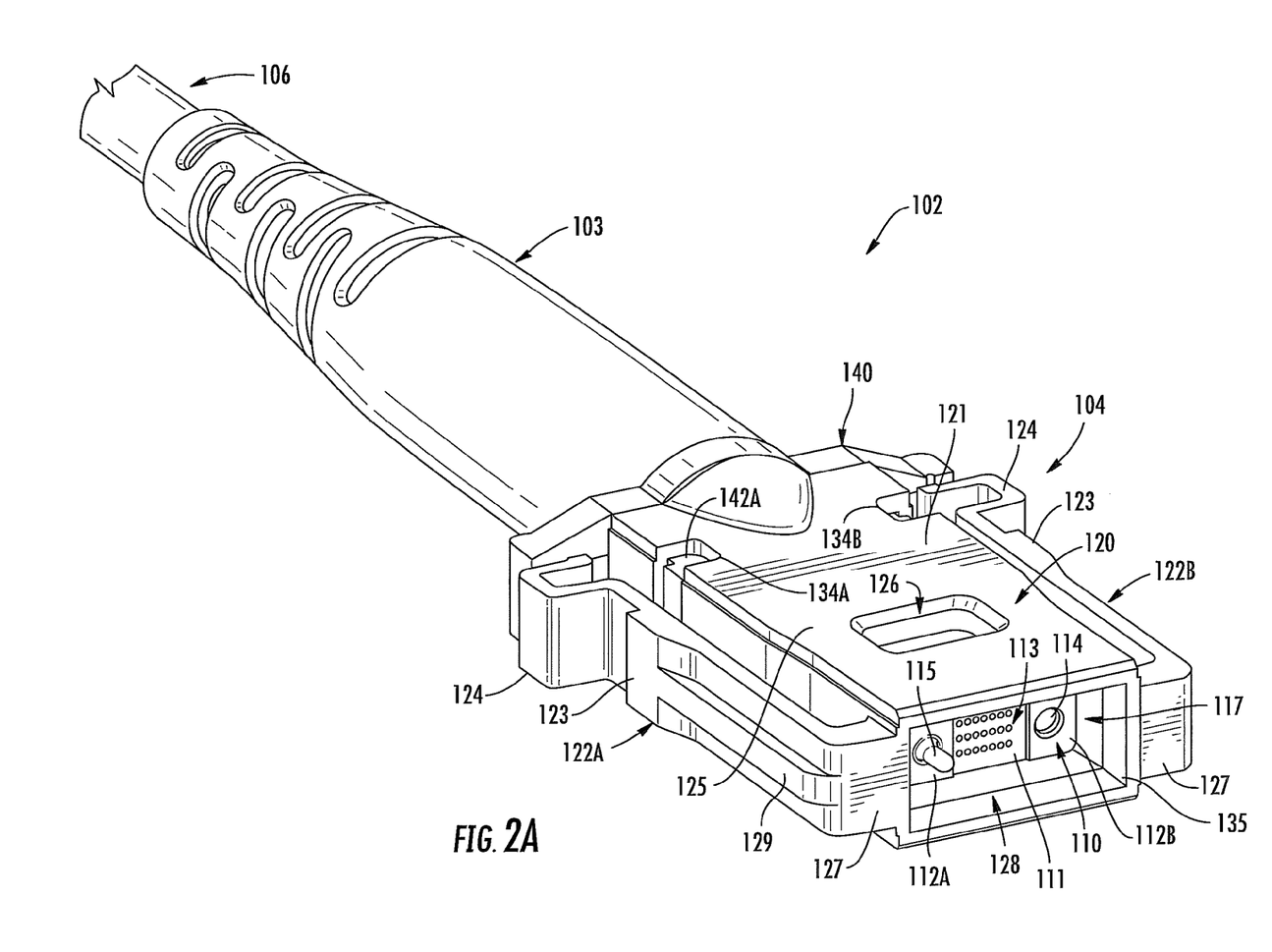
FIGS. 2A and 2B are perspective views of the fiber optic plug assembly depicted in FIGS. 1A and 1B.
Figure 2B:
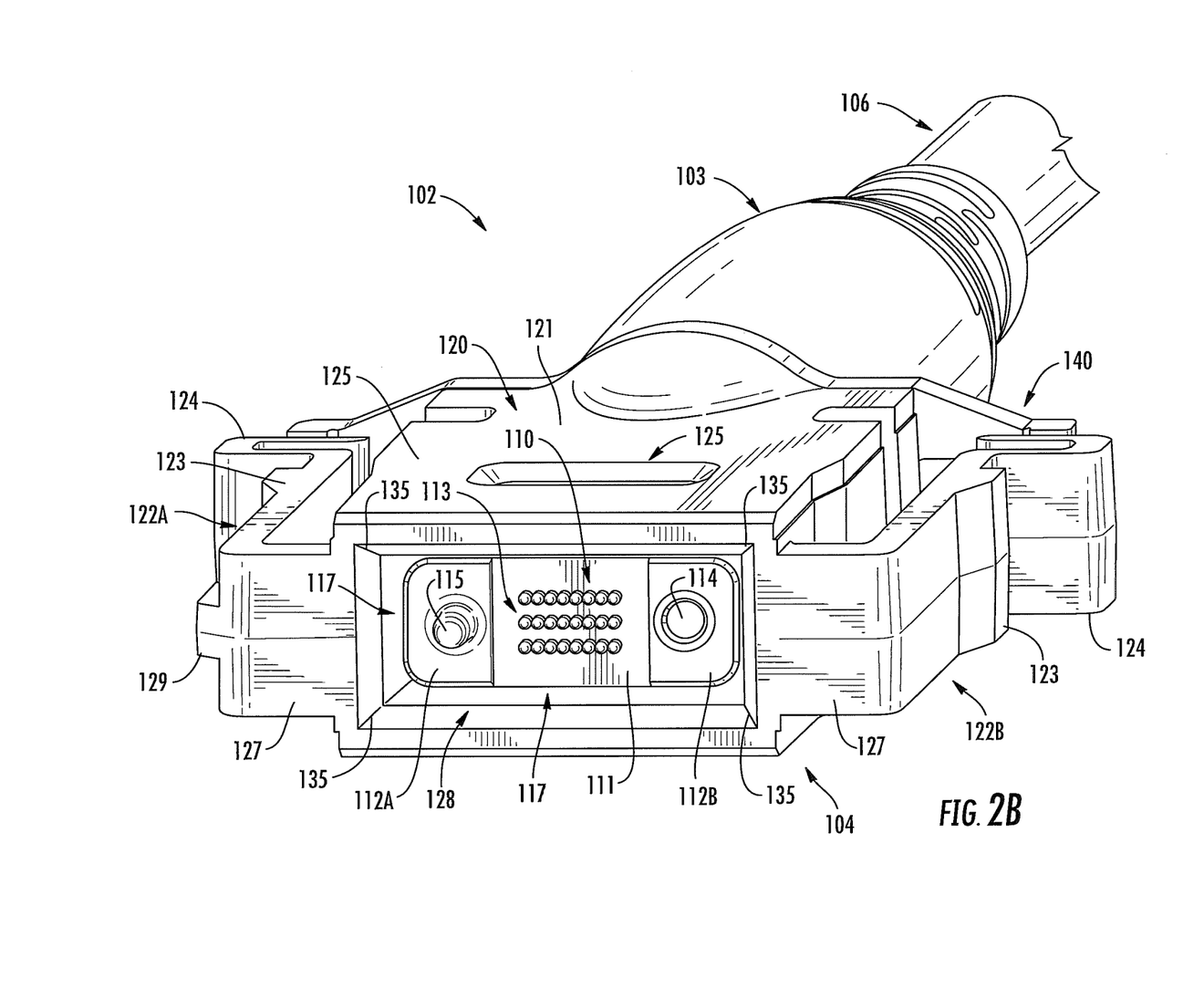
Figure 3A:
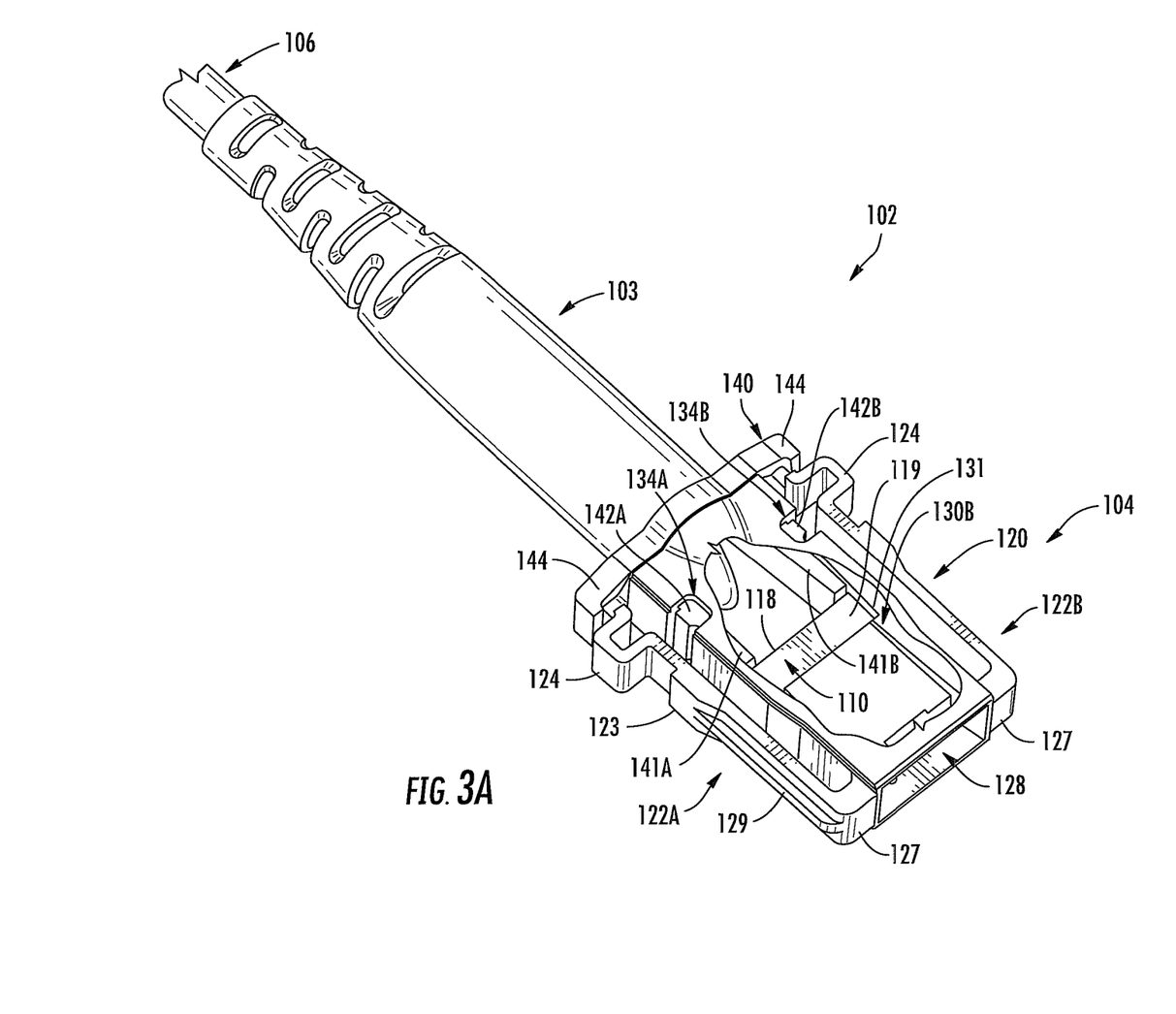
FIG. 3A is a perspective, partial cutaway view of the fiber optic plug assembly depicted in FIGS. 1A and 1B.
Figure 3B:
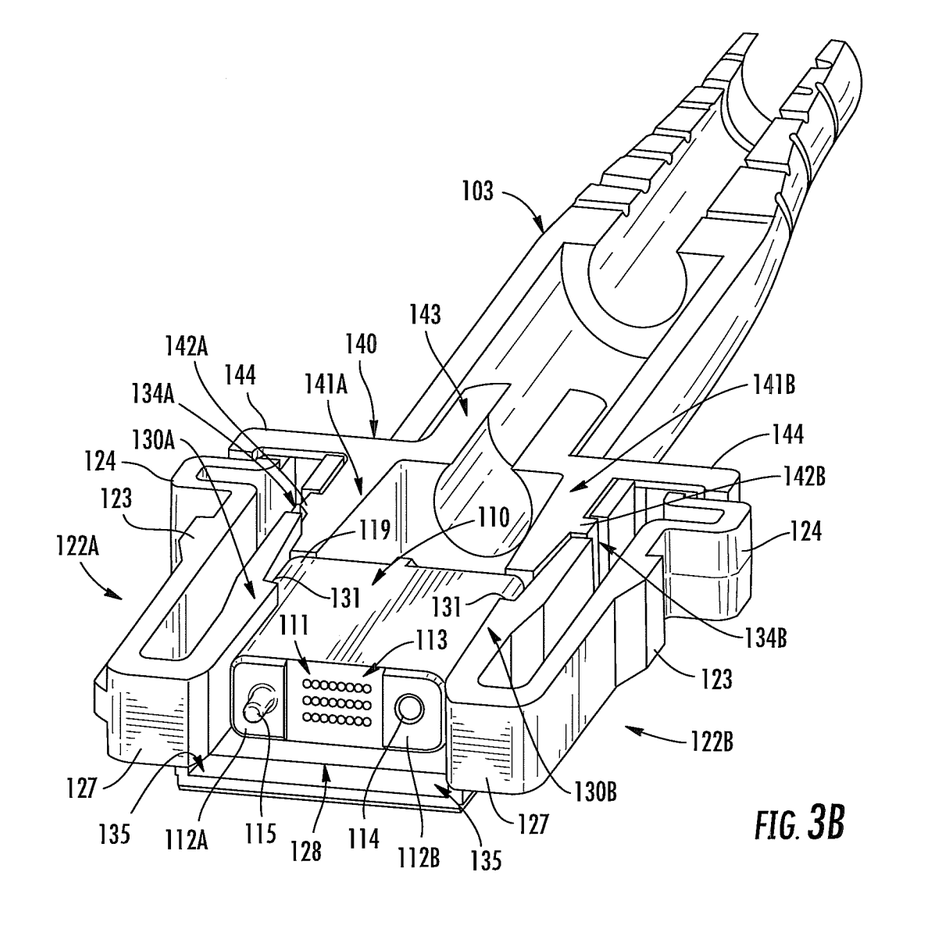
FIG. 3B is a perspective, cross-sectional view of the fiber optic plug assembly depicted in FIGS. 1A and 1B.

The optical cable assembly 102 generally includes a fiber optic cable 106 that is coupled to a fiber optic plug assembly 104. The fiber optic cable 106 may includes an outer jacket that surrounds and protects a plurality of optical fibers configured to optical transmission of optical signals. As described in more detail below, the fiber optic cable 106 may be connected to a rear portion of the fiber optic plug assembly 104 by a cable attachment element 140 and a strain relief element 103. The fiber optic plug assembly 104 generally comprises a plug body 120 that defines a ferrule enclosure 117 (see FIGS. 2A and 2B) into which a recessed plug ferrule element 110 is disposed. Having the plug ferrule element 110 recessed within the plug body 120 protects the lens elements of the plug ferrule element 110 from mechanical damage. The recessed plug ferrule element 110 is described in more detail below with reference to FIGS. 2A and 2B. The plug body 120 includes a plug body opening 128 at an insertion surface 127 that is the surface of the plug body 120 that is inserted into the fiber optic receptacle assembly 150. The plug body opening 128 is configured to receive a mated receptacle ferrule element 180 (see FIG. 4) when the fiber optic plug assembly 104 is coupled to the fiber optic receptacle assembly 150. As shown in FIGS. 3A and 3B, the plug body opening 128 may be flared outwardly to accept and guide a mated receptacle ferrule member into the ferrule enclosure 117.

In the illustrated embodiment, a top surface 125 of the plug body 120 includes an opening 126 providing access to the plug ferrule element 110. In some embodiments, an adhesive may be injected into the opening 126 and into the plug ferrule element 110 for securing optical fibers to the plug ferrule element 110. In other embodiments, no such opening 126 is provided.

The illustrated plug body 120 further includes a first attachment notch 134A and a second attachment notch 134B that are configured to receive a first latching element 142A and a second latching element 142B of the cable attachment element 140 (e.g., detents). The plug body 120 may be attached to the cable attachment element 140, which is further attached to the fiber optic cable 106, by snapping the first and second latching elements 142A, 142B into the first and second attachment notches 134A, 134B, respectively.

The illustrated fiber optic receptacle assembly 150 generally includes a receptacle housing 160, a receptacle ferrule element 180 (see FIG. 4), and clip member 170. The receptacle housing 160 has an insertion surface 166 that defines a receptacle opening 164 into which the plug body 120 of the fiber optic plug assembly 104 is inserted as shown in FIG. 1B. The receptacle ferrule element 180 is disposed within the receptacle opening 164 such that it is recessed with respect to the receptacle opening 164 and the insertion surface 166. The receptacle housing 160 has a first lock opening 163A and a second lock opening 163B on opposing sides that are configured to receive a locking mechanism of the plug body 120 to retain an engaged relationship between the fiber optic plug assembly 104 and the fiber optic receptacle assembly 150.

The fiber optic receptacle assembly 150 may be configured to be coupled to a panel or other structure of a data cabinet, for example. The illustrated fiber optic receptacle assembly 150 comprises a flange portion 161 that extends from a receptacle enclosure portion 162 in a plane that is parallel to the insertion surface 166. The flange portion 161 may be disposed within an opening of the data cabinet, for example. Receptacle housing 160 comprises a ferrule portion 165 that extends from the flange portion 161 opposite from the receptacle enclosure portion 162. As described in more detail below, the receptacle ferrule element 180 and a bias member may be disposed within the ferrule portion 165. In other embodiments, a plurality of receptacle portions 162 and ferrule portions 165 may extend from a single flange portion 161 (e.g., in a column, row, array, etc.).

As shown in FIGS. 1A and 1B, a clip member 170 having a first arm 171A and a second arm 171B is attached to the ferrule portion 165 of the receptacle housing 160. The first and second arms 171A and 171B may be compliant to remove the clip member 170 from the receptacle housing 160. The illustrated clip member 170 includes an optical fiber opening 172 through which individual optical fibers (e.g., included in an optical cable or separately provided) may be disposed and coupled to the receptacle ferrule element 180. As described below, the clip member 170 also supports the bias member 190 (e.g., FIG. 5A) that biases the receptacle ferrule element 180 toward the receptacle opening 164.

The configuration of the exemplary plug body 120 is such that it mates with the receptacle housing 160 of the fiber optic receptacle assembly 150. In the illustrated embodiment, the plug body 120 comprises a first latching arm 122A and a second latching arm 122B that extend from the insertion surface 127 and are offset from a main portion 121 of the plug body 120. Although two latching arms are depicted, it should be understood that more or fewer may be provided in alternative embodiments. The illustrated first and second latching arms 122A, 122B include a detent 123 that act as a locking mechanism that is configured to engage the first and second lock openings 163A, 163B when the fiber optic plug assembly 104 is inserted into the fiber optic receptacle assembly 150. In some embodiments, one or more of the first and second latching arms 122A, 122B have a keying feature (e.g., keying feature 129) configured to mate with corresponding keying feature(s) of the fiber optic receptacle assembly 150 such that only the proper fiber optic plug assembly 104 may be inserted into the proper fiber optic receptacle assembly 150 in a proper orientation.

The first and second latching arms 122A, 122B include a release tab 124 at an end that is distal from the insertion surface 127. The first and second latching arms 122A, 122B are compliant in a direction transverse to the insertion direction A upon application of force applied to the release tabs 124.

Referring to FIG. 1B, when the fiber optic plug assembly 104 is fully coupled to the fiber optic receptacle assembly 150, the plug body 120 is disposed within the receptacle enclosure defined by the receptacle housing 160 such that the detent 123 of the first and second latching arms 122A, 122B is disposed within the first and second lock opening 163A, 163B. To remove the fiber optic plug assembly 104 from the fiber optic receptacle assembly 150, a user may apply force to the release tabs 124 of the first and second latch arms 122A, 122B to move the detents 123 away from the first and second lock openings 163A, 163B. The fiber optic plug assembly 104 may then be pulled out of the fiber optic receptacle assembly 150.

The exemplary fiber optic plug assembly 104 of the exemplary optical cable assembly 102 will now be described with respect to FIGS. 2A-3B. FIGS. 2A and 2B are front perspective views of the fiber optic plug assembly 104, FIG. 3A is a partial cutaway view of the fiber optic plug assembly 104, and FIG. 3B is a cross-sectional view of the fiber optic plug assembly 104.

Referring generally to FIGS. 2A-3B, the exemplary plug ferrule element 110 has a front face that is defined by a mechanical coupling face comprising a first mechanical coupling surface 112A and a second mechanical coupling surface 112B positioned on opposite sides of an optical interface surface 111. The first and second mechanical coupling surfaces 112A, 112B are offset from the optical interface surface 111 such that the first and second mechanical coupling surfaces 112A, 112B are raised from the optical interface surface 111 (i.e., proud). The one or more of the first and second mechanical coupling surfaces 112A, 112B may include an alignment feature for mating with a mated receptacle ferrule element 180 of the fiber optic receptacle assembly 150. In the illustrated embodiment, an alignment pin 115 extends from the first mechanical coupling surface 112A as an alignment feature, and an alignment bore 114 is provided in the second mechanical coupling surface 112B as an alignment feature. In alternative embodiments, both alignment features may be configured as alignment pins, or both alignment features may be configured as alignment bores. Engagement between the alignment pin 115 and the alignment bore 114 with a corresponding alignment bore and a corresponding alignment pin of the receptacle ferrule element 180 is described in detail below.

The optical interface surface 111 comprises a plurality of lens elements 113 that are optically coupled to a plurality of optical fibers (not shown) of the fiber optic cable 106. The plurality of optical fibers are secured within the plug ferrule element 110. The illustrated lens elements 113 are configured as refractive lenses that protrude from the optical interface surface 111. The lens elements 113 should be made of a material that is transmissive to one or more wavelengths of optical signals propagating therethrough. The lens elements 113 may be concave or convex with respect to optical interface surface 111, for example. In some embodiments, the lens elements 113 (as well as the remainder of the plug ferrule element 110) are made of polyetherimide, such as ULTEM resin. It should be understood that other optically transmissive materials may be used. As an example and not a limitation, the ferrule element and lens elements may be fabricated by a molding process. The first and second mechanical coupling surfaces 112A, 112B are offset from the optical interface surface 111 to prevent contact of the lens elements 113 to the lens elements of the mated receptacle ferrule element 180. In the illustrated embodiment, twenty-four lens elements are provided in three rows. However, it should be understood that embodiments are not limited to the number or configuration of the lens elements depicted throughout the figures since any suitable number of lens elements or arrangement may be used as desired.

In alternative embodiments, the optical interface surface 111 is flush with the mechanical coupling face (i.e., the plug ferrule 110 has a single front face in a single plane). In these embodiments, the entire front face of the plug ferrule 110 contacts the front face of a mated receptacle ferrule. To prevent damage to the lens elements 113 upon mechanical coupling, the lens elements 113 may be configured as convex with respect to the optical plane defined by the front face. Accordingly, the lens elements 113 are recessed from the front face such that the optical interface surface also serves as a mechanical reference plane.

The plug ferrule element 110 is recessed within a ferrule enclosure 117 defined by the plug body 120. Accordingly, the first and second mechanical coupling surfaces 112A, 112B and the optical interface surface 111 do not protrude past the insertion surface 127 of the plug body 120 but rather are offset from the insertion surface 127 in a direction opposite from the insertion direction.

Referring now to FIGS. 3A and 3B, the interior walls of the plug body 120 include features to retain the plug ferrule element 110 in the ferrule enclosure 117. The plug ferrule element 110 may be disposed within the plug body 120 such that it floats within the enclosure to aid in finely aligning the plug ferrule element 110 with the receptacle ferrule element 180 during mating of the optical connectors. For example, the plug ferrule element 110 may be configured to move slightly in a direction transverse to the insertion direction A. The exemplary plug ferule element 110 includes a rear flanged portion 119 having a rear surface 118 into which the optical fibers (not visible) may enter the plug ferrule element 110. The ability for the plug ferrule element 110 to float within the plug body 120 may also isolate it from external forces applied to the plug body 120.

First and second interior walls 130A, 130B include a notch 131 that may engage the flanged portion 119 of the plug ferrule element 110. Other engagement features may also be provided such that the plug ferrule element 110 is secured within the ferrule enclosure 117. It is noted that, in the illustrated embodiment, a bias member (e.g., one or more springs) is not provided within the ferrule enclosure. As described below, a bias member 190 is provided in the fiber optic receptacle assembly 150. The bias member 190 maintains the plug ferrule element 110 and the receptacle ferrule element 180 in an optical coupled relationship when the two ferrules are mated together. Absence of a bias member in the plug body 120 may reduce assembly complexity and costs, as well as increase the reparability of the fiber optic plug assembly 104 in the field. For example, with no bias member present, the optical fibers of the fiber optic ribbon are fully accessible during assembly/processing. This may simplify the processing of multiple, closely packed fiber optic ribbons, and the longer buckle zone for the optical fibers may make the length tolerances less severe. However, it should be understood that one or more bias members may be provided in the plug body 120.

The first and second interior walls 130A, 130B of the plug body 120 further include first and second attachment lock openings 134A, 134B that are configured to receive first and second latching elements 142A, 142B of the cable attachment element 140. As shown in FIG. 3B, the cable attachment element 140 comprises a first and second attachment prongs 141A, 141B that extend from a rear portion 144. The first and second attachment prongs 141A, 141B comprise first and second latching elements 142A, 142B. When the first and second attachment prongs 141A, 141B are positioned within the ferrule enclosure 117 defined by the plug body 120, the first and second latching elements 142A, 142B engage the first and second attachment lock openings 134A, 134B, thereby securing the cable attachment element 140 to the plug body 120.

The exemplary cable attachment element 140 further includes an extending or threaded portion 143 that extends from the rear portion 144. The extending portion 143 is configured to engage the strain relief element 103.

Figure 4:
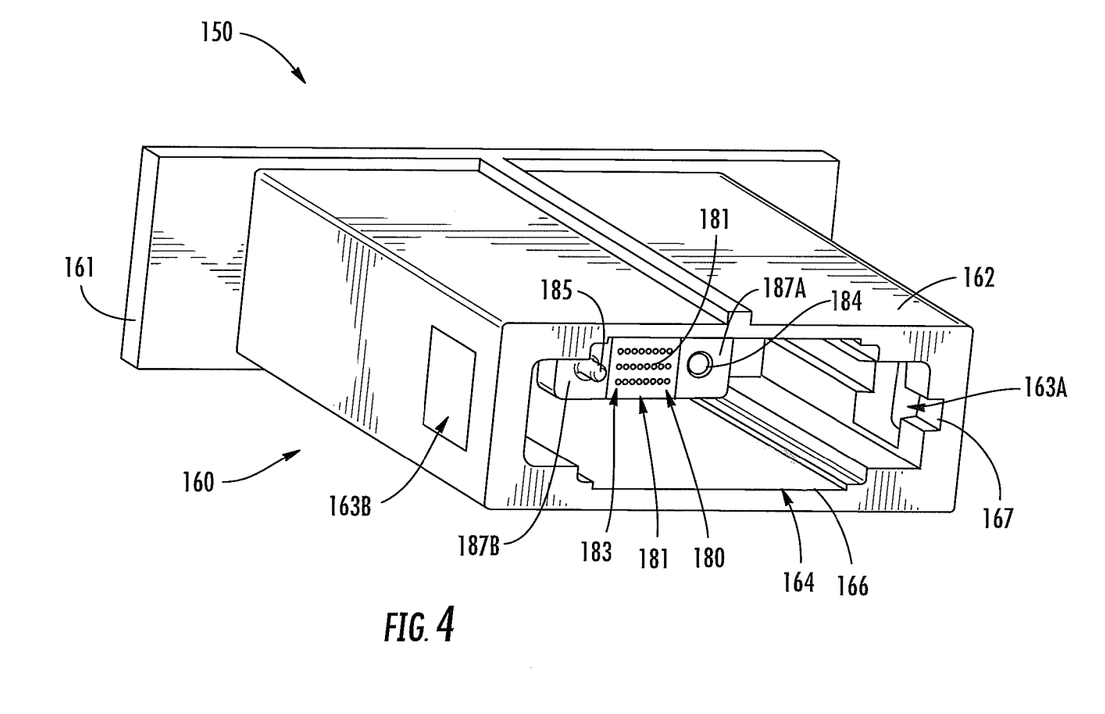
FIG. 4 is a front perspective view of the fiber optic receptacle depicted in FIGS. 1A and 1B.
Figure 5A:
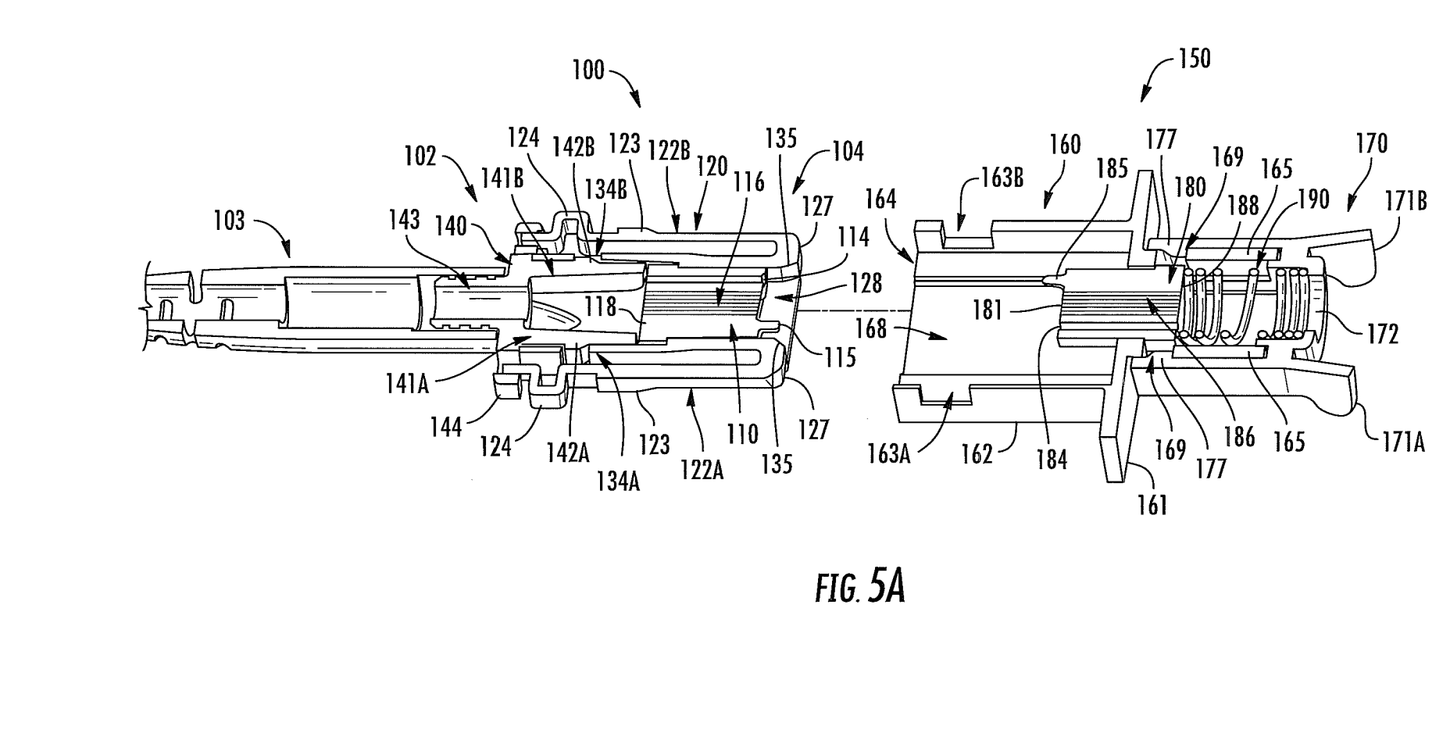
FIG. 5A is a perspective, cross-sectional view of the optical data center connector system depicted in FIG. 1A wherein the fiber optic plug assembly and the fiber optic receptacle assembly are in an unmated relationship.
Figure 5B:
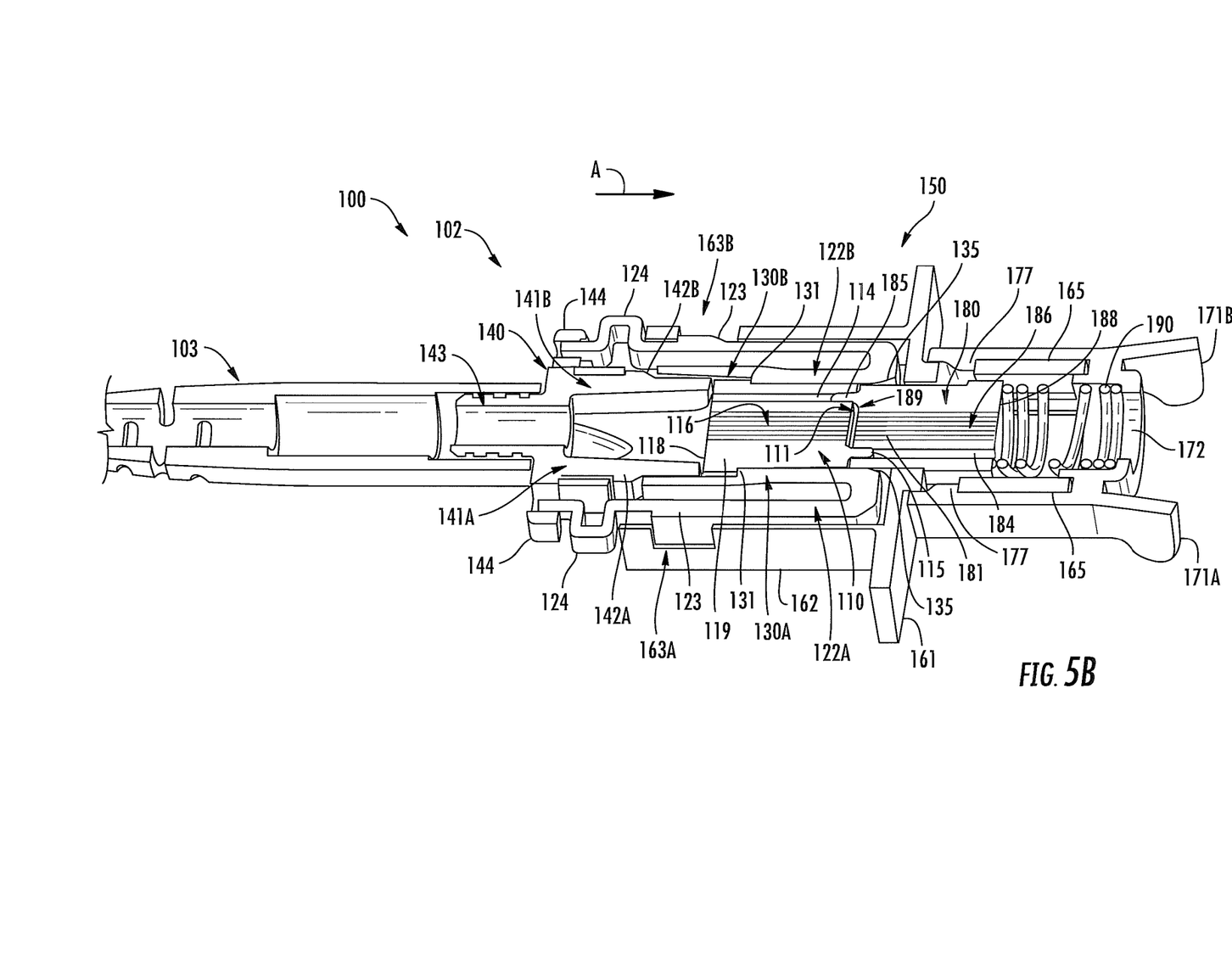
FIG. 5B is a perspective, cross-sectional view of the optical data center connector system depicted in FIG. 1B wherein the fiber optic plug assembly and the fiber optic receptacle assembly are in a mated relationship.
Figure 5C:
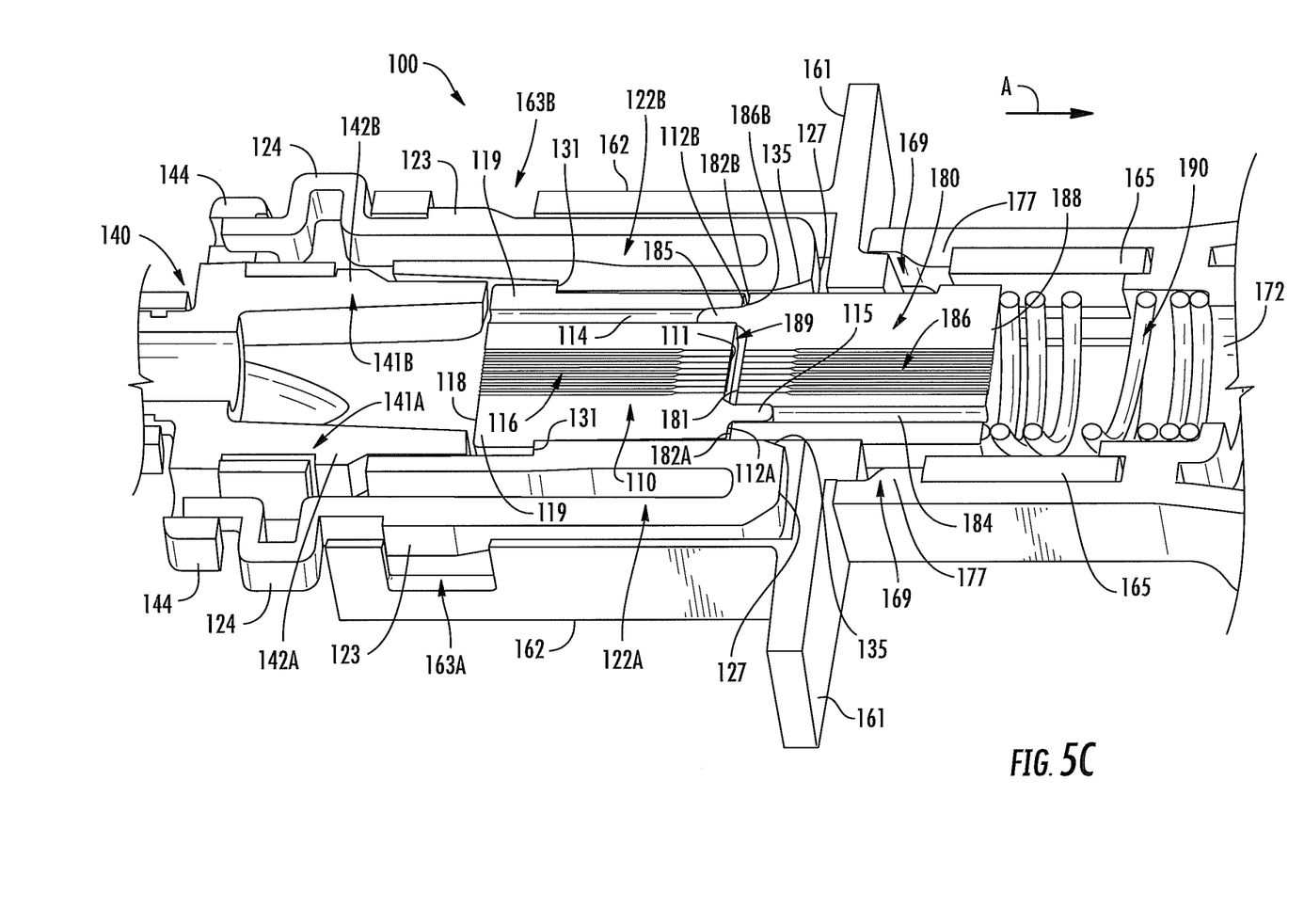
FIG. 5C is close-up of the perspective, cross-sectional view of the optical data center connector depicted in FIG. 5B.

Referring now to FIG. 4, a front perspective view of the fiber optic receptacle assembly 150 depicted in FIGS. 1A and 1B is provided. The receptacle ferrule element 180 is recessed within a receptacle enclosure 168 defined by the receptacle housing 160. Like the plug ferrule element 110, the receptacle ferrule element 180 has a front face that is defined by a mechanical coupling face comprising a first mechanical coupling surface 187A and a second mechanical coupling surface 187B positioned on opposite sides of an optical interface surface 181. The first and second mechanical coupling surfaces 187A, 187B are offset from the optical interface surface 181 such that they are raised from the optical interface surface 181 (i.e., proud). The optical interface surface 181 includes a plurality of lens elements 183 arranged and configured to be optically coupled to the plurality of lens elements 113 of the plug ferrule element 110. The optical interface surface 181 and the plurality of lens elements 113 are protected by the receptacle housing 160 because they are recessed within the receptacle enclosure 168.

The first mechanical coupling surface 187A includes an alignment feature configured as an alignment bore 184 that mates with the alignment pin 115 of the plug ferrule element 110, and the second mechanical coupling surface 187B includes an alignment feature configured as an alignment pin 185 that mates with the alignment bore 114 of the plug ferrule element 110.

The receptacle housing 160 has a receptacle opening 164 that is configured to receive the plug body 120 of the fiber optic plug assembly 104. As described in more detail below, the shape of the plug body 120 and the interior walls of the receptacle housing 160 are such that the optical interface surface 111 of the plug ferrule element 110 is guided toward the optical interface surface 181 of the receptacle ferrule element 180. Additionally, the illustrated receptacle housing includes a keying feature 167 that is configured to mate with the keying feature 129 of the plug body 120.

It is noted that, in some embodiments, the fiber optic plug assembly 104 and/or the fiber optic receptacle assembly 150 may include an intelligent patching component (e.g., a sensor or RFID tag capability) to enable intelligent patching.

FIGS. 5A-5C depict cross-sectional views of the exemplary fiber optic plug assembly 104 and the fiber optic receptacle assembly 150 of the exemplary optical data center connector system 100. FIG. 5A depicts the fiber optic plug assembly 104 in an unmated state, while FIG. 5B depicts the fiber optic plug assembly 104 in a mated state. FIG. 5C is a close-up view of the plug ferrule element 110 coupled to the receptacle ferrule element 180.

As shown in FIGS. 5A and 5B, the illustrated fiber optic receptacle assembly 150 includes a bias member 190 that is disposed between a rear surface 188 of the receptacle ferrule element 180 and a rear portion of the clip member 170. The bias member 190 of the illustrated embodiment is configured as a spring that biases the receptacle ferrule element 180 in a direction toward the receptacle opening 164. In other embodiments, the bias member 190 may be a molded component that is integral with the remainder of the receptacle housing 160. The receptacle ferrule element 180 is disposed within the receptacle housing 160 such that it has freedom to move not only along directions parallel to the insertion direction A, but also move slightly in directions transverse to the insertion direction A. The ability of the receptacle ferrule element 180 to float within the receptacle housing 160 allows fine alignment between the receptacle ferrule element 180 and the plug ferrule element 110, as well as isolates the receptacle ferrule element 180 from external forces applied to the receptacle housing 160.

The first and second arms 171A, 171B of the clip member 170 have a detent 177 that is configured to be coupled to an opening 169 of the ferrule portion 165 of the receptacle housing 160 when the clip member 170 is engaged with the receptacle housing 160. The clip member 170 may be disengaged from the receptacle housing 160 by applying an inward force to the ends of the first and second arms 171A, 171B and pulling back on the clip member 170.

Optical fibers (not shown) may be disposed through the optical fiber opening 172 and then enter the receptacle ferrule element 180 at the rear surface 188. A plurality of bores 186 are provided to receive a plurality of optical fibers such than the ends of the individual optical fibers are optically coupled to the lens elements 183 at the optical interface surface 181. Similarly, the plug ferrule element 110 includes a plurality of bores 116 to receive a plurality of optical fibers such that the ends of the individual optical fibers are optically coupled to the lens elements 113 at the optical interface surface 111. Each of the bores of the plurality of bores 116, 186 may comprise a wide portion having a diameter to accept an non-stripped portion of the optical fiber, and a narrow portion having a diameter to accept a stripped portion of the optical fiber wherein an outer jacket or coating layer of the optical fiber has been stripped away.

Referring to FIGS. 5A-5C, the plug body 120 of the illustrated embodiment includes a lead-in structure 135 near the plug body opening 128. As shown in FIGS. 5A-5C, the lead-in structure 135 may be configured as a flared portion of the plug body opening 128 that tapers inwardly. The lead-in structure 135 tapers to a tighter passage to guide the receptacle ferrule element 180. The tighter passage of the ferrule enclosure 117 narrows so it is tight enough to ensure that the receptacle ferrule element 180 properly enters the ferrule enclosure 117 defined by the plug body 120. In this manner, the lead-in structure 135 provides pre-alignment for the receptacle ferrule element 180 and the plug ferrule element 110.

When the plug body 120 is inserted into the receptacle housing 160, the first and second latching arms 122A, 122B are deflected by contact with the interior surface of the receptacle housing 160. The lead-in structure 135 at the plug body opening 128 of guides the receptacle ferrule element 180 into the ferrule enclosure 117 defined by the plug body 120, thereby providing coarse alignment of the two ferrule elements 110, 180. The alignment pin 115 of the plug ferrule element 110 is inserted into the alignment bore 184 of the receptacle ferrule element 180, and the alignment pin 185 of the receptacle ferrule element 180 is inserted into the alignment bore 114 of the plug ferrule element 110 as the plug body 120 is inserted into the receptacle housing 160. The pre-alignment provided by the lead-in structure 135 prevents pin stubbing of the alignment pins 115, 185 (i.e., contact of the alignment pins 115, 185 with the mechanical coupling surface rather than the respective alignment bores 184. The first and second mechanical coupling surfaces 112A, 112B of the plug ferrule element 110 may contact, or nearly contact, the first and second mechanical coupling surfaces 182A, 182B of the receptacle ferrule element 180.

As the plug body 120 is further inserted into the receptacle housing 160, the plug body 120 pushes the receptacle ferrule element 180 back along the insertion direction A. The bias member 190 compresses as the receptacle ferrule element 180 is translated along the insertion direction A. The plug body 120 may be inserted into the receptacle housing 160 until the detents 123 of the first and second latching arms 122A, 122B are positioned and locked into the first and second lock openings 163A, 163B. The bias member 190 continues to apply a spring force such that the receptacle ferrule element 180 remains engaged with the plug ferrule element 110.

Referring specifically to FIG. 5C, because the optical interface surfaces 111, 181 are offset with respect to the mechanical coupling surfaces, the optical interface surface 111 and plurality of lens elements 113 of the plug ferrule element 110 do not physically contact the optical interface surface 181 and plurality of lens element 183 of the receptacle ferrule element 180. As shown in FIG. 5C, a gap 189 is present between the two mated optical interface surfaces 111, 181. Accordingly, the lens elements of the respective ferrule elements will not be damaged by physical contact with one another.

The fiber optic plug assembly 104 may be removed from the fiber optic receptacle assembly 150 by applying an inward force to the release tabs 124 on the plug body 120 to release the detents 123 from the first and second lock openings 163A, 163B, and by pulling the fiber optic plug assembly 104 from the fiber optic receptacle assembly 150 in a direction opposite from the insertion direction A.

It should now be understood that embodiments described herein are directed to optical data center connector systems comprising a fiber optic plug assembly and a fiber optic receptacle assembly having recessed ferrule elements. The recessed ferrule elements are protected from mechanical damage by an outer housing or body. The recessed ferrule elements have an optical interface surface with lens elements, wherein the optical interface surface is offset with respect to the mechanical coupling face such that when the plug ferrule element is mated to the receptacle ferrule element, the two optical interface surfaces do not contact one another. The shape of a plug body of the fiber optic plug assembly and the receptacle housing of the fiber optic receptacle assembly provide a coarse alignment of the respective ferrule elements. Alignment features on each respective ferrule element may provide for additional alignment functionality.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

The invention claimed is:

1. A fiber optic plug assembly comprising:
a plug body comprising an insertion surface and a plug body opening at the insertion surface, wherein the plug body defines a ferrule enclosure coupled in free space to the plug body opening, and the plug body opening tapers inwardly defining a lead-in structure for guiding a receptacle ferrule element into the plug body;
a ferrule element secured and disposed within the ferrule enclosure of the plug body, the ferrule element comprising:
a mechanical coupling face exposed by the plug body opening, wherein the mechanical coupling face is configured to contact a mated mechanical coupling face of a mated receptacle ferrule;
an optical interface surface recessed within the ferrule enclosure of the plug body when the fiber optic plug assembly is in an unmated state; and
a plurality of lens elements at the optical interface surface, wherein the ferrule element is disposed within the ferrule enclosure such that the optical interface surface is recessed with respect to the insertion surface of the plug body.

2. The fiber optic plug assembly of claim 1, wherein the optical interface surface is offset from the mechanical coupling face such that the mechanical coupling face is raised from the optical interface surface.

3. The fiber optic plug assembly of claim 2, wherein the mechanical coupling face comprises a first mechanical coupling surface and a second mechanical coupling surface, and the optical interface surface is located between the first mechanical coupling surface and the second mechanical coupling surface.

4. The fiber optic plug assembly of claim 2, wherein the plurality of lens elements protrude from the optical interface surface.

5. The fiber optic plug assembly of claim 1, wherein the ferrule element further comprises a first alignment feature and a second alignment feature.

6. The fiber optic plug assembly of claim 5, wherein at least one of the first alignment feature or the second alignment feature comprises an alignment pin, and at least one of the first alignment feature or the second alignment feature comprises an alignment bore.

7. The fiber optic plug assembly of claim 1, wherein the optical interface surface and the mechanical coupling face are located in a single plane.

8. The fiber optic plug assembly of claim 7, wherein the plurality of lens elements comprises a plurality of convex lens elements convex with respect to the optical interface surface.

9. The fiber optic plug assembly of claim 1, wherein each individual lens of the plurality of lens elements is a refractive lens.

10. The fiber optic plug assembly of claim 1, wherein a top surface and/or a bottom surface of the plug body comprise an opening for injecting an adhesive.

11. The fiber optic plug assembly of claim 1, further comprising a cable attachment element coupled to the plug body at a rear opening of the plug body that is opposite from the plug body opening.

12. The fiber optic plug assembly of claim 11, further comprising a strain relief element disposed about the cable attachment element.

13. The fiber optic plug assembly of claim 1, wherein the ferrule element is configured such that the plurality of lens elements are configured to be coupled to a plurality of optical fibers.

14. The fiber optic plug assembly of claim 1, wherein the plug body is mated with a receptacle housing of a fiber optic receptacle assembly.

15. The fiber optic plug assembly of claim 1, wherein the plug body further comprises a main portion and at least one latching arm offset from the main portion.

16. The fiber optic plug assembly of claim 15, wherein the at least one latching arm is compliant in a direction transverse to the insertion direction.

17. The fiber optic plug assembly of claim 15, wherein the at least one latching arm comprises a keying feature.

18. The fiber optic plug assembly of claim 1, further comprising an intelligent patching component.

19. An optical cable assembly comprising:
a fiber optic plug assembly comprising:
- a plug body comprising an insertion surface and a plug body opening at the insertion surface, wherein the plug body defines a ferrule enclosure coupled in free space to the plug body opening, and the plug body opening tapers inwardly defining a lead-in structure for guiding a receptacle ferrule element into the plug body;
- a ferrule element secured and disposed within the ferrule enclosure of the plug body, the ferrule element comprising:
  - a mechanical coupling face exposed by the plug body opening, wherein the mechanical coupling face is configured to contact a mated mechanical coupling face of a mated receptacle ferrule;
  - an optical interface surface recessed within the ferrule enclosure of the plug body when the fiber optic plug assembly is in an unmated state; and
  - a plurality of lens elements at the optical interface surface, wherein the ferrule element is disposed within the ferrule enclosure such that the optical interface surface is recessed with respect to the insertion surface of the plug body; and
a fiber optic cable comprising a plurality of optical fibers disposed in the ferrule element and optically coupled to the plurality of lens elements.

20. The optical cable assembly of claim 19, wherein the optical interface surface is offset from the mechanical coupling face such that the mechanical coupling face is raised from the optical interface surface.

21. The optical cable assembly of claim 20, wherein the mechanical coupling face comprises a first mechanical coupling surface and a second mechanical coupling surface, and the optical interface surface is located between the first mechanical coupling surface and the second mechanical coupling surface.

22. The optical cable assembly of claim 21, wherein the ferrule element further comprises a first alignment feature located at the first mechanical coupling surface, and a second alignment feature located at the second mechanical coupling surface.

23. The optical cable assembly of claim 22, wherein at least one of the first alignment feature or the second alignment feature comprises an alignment pin, and at least one of the first alignment feature or the second alignment feature comprises an alignment bore.

24. The optical cable assembly of claim 20, wherein the plurality of lens elements protrude from the optical interface surface.

25. The optical cable assembly of claim 19, wherein the optical interface surface and the mechanical coupling face are located in a single plane.

26. The optical cable assembly of claim 25, wherein the plurality of lens elements comprises a plurality of convex lens elements convex with respect to the optical interface surface.

27. The optical cable assembly of claim 19, wherein the lead-in structure comprises a flare at the plug body opening.

28. The optical cable assembly of claim 19, wherein each individual lens of the plurality of lens elements is a refractive lens.

29. The optical cable assembly of claim 19, wherein a top surface and/or a bottom surface of the plug body comprise an opening for injecting an adhesive.

30. The optical cable assembly of claim 19, further comprising a cable attachment element coupled to the plug body at a rear opening of the plug body that is opposite from the plug body opening.

31. The optical cable assembly of claim 30, wherein the fiber optic cable enters the plug body through the cable attachment element and the rear opening of the plug body.

32. The optical cable assembly of claim 31, further comprising a strain relief element disposed about the cable attachment element and the fiber optic cable.

33. The optical cable assembly of claim 19, wherein the plug body is mated with a receptacle housing of a fiber optic receptacle assembly.

34. The optical cable assembly of claim 19, wherein the plug body further comprises a main portion and at least one latching arm offset from the main portion.

35. The optical cable assembly of claim 34, wherein the at least one latching arm is compliant in a direction transverse to the insertion direction.

36. The optical cable assembly of claim 34, wherein the at least one latching arm comprises a detent.

37. The optical cable assembly of claim 34, wherein the at least one latching arm comprises a keying feature.

38. The optical cable assembly of claim 19, further comprising an intelligent patching component.

* * * * *